United States Patent [19]
Chiarot et al.

[11] Patent Number: 5,721,864
[45] Date of Patent: Feb. 24, 1998

[54] PREFETCHING INSTRUCTIONS BETWEEN CACHES

[75] Inventors: Kevin Arthur Chiarot, Pflugerville; Michael John Mayfield, Austin; Era Kasturia Nangia, Austin; Milford John Peterson, Austin, all of Tex.

[73] Assignee: International Business Machines Corporation, Armonk, N.Y.

[21] Appl. No.: 531,948

[22] Filed: Sep. 18, 1995

[51] Int. Cl.$^6$ .................................................. G06F 12/08
[52] U.S. Cl. .......................... 395/464; 395/449; 395/383; 395/584; 395/411
[58] Field of Search ........................ 395/448, 449, 395/450, 452, 453, 464, 467, 403, 414, 421.03, 375, 410, 411, 381–383, 584, 580–583, 585–591

[56] References Cited

U.S. PATENT DOCUMENTS

| | | | |
|---|---|---|---|
| 5,155,832 | 10/1992 | Hunt | 395/447 |
| 5,185,871 | 2/1993 | Frey et al. | 395/375 |
| 5,214,765 | 5/1993 | Jensen | 395/449 |
| 5,276,848 | 1/1994 | Gallagher et al. | 395/448 |
| 5,386,547 | 1/1995 | Jouppi | 395/449 |
| 5,455,925 | 10/1995 | Kitahara et al. | 395/449 |
| 5,542,062 | 7/1996 | Taylor et al. | 395/403 |
| 5,551,001 | 8/1996 | Cohen et al. | 395/449 |
| 5,553,255 | 9/1996 | Jain et al. | 395/582 |
| 5,590,293 | 12/1996 | Uhler et al. | 395/581 |

OTHER PUBLICATIONS

Ryan, Challenges Pentium: The Cyrix architecture brings more of the benefits of superpipelining and superscalar execution to 80×86 programs without requiring recompilation, BYTE, vol. 19, No. 1, p. 83, Jan. 1994.

Case, The Primer, Windows Sources, vol. 3, No. 5, p. 144(5), May 1995.

Pomerene, Reducing cache misses in a branch history table machine, IBM Technical Disclosure Bulletin, vol. 23, No. 2, p. 853, Jul. 1980.

Ron Wilson, CompCon 95 sees battle of the CPUs, Electronic Engineering Times, n839, p(2), Mar. 13, 1995.

*Primary Examiner*—Matthew M. Kim
*Attorney, Agent, or Firm*—Kelly K. Kordzik Winstead Sechtest & Minick P.C.; Anthony V.S. England

[57] ABSTRACT

A method for selectively pre-fetching Line M+1 into an L1 instruction cache from an L2 cache or from main memory during the execution of Line M. If unresolved branches exist in pending Line M, Line M+1 is speculative and may be pre-fetched into L1 instruction cache only from L2 cache, not from main memory. Unresolved branches in pending Line M are resolved before Line M+1 is pre-fetched from main memory. If no unresolved branches exist, Line M is committed ("inevitable-speculative") and is pre-fetched from main memory. In this way, no potentially wasteful pre-fetches are performed and main memory bandwidth is preserved.

15 Claims, 2 Drawing Sheets

PREFETCHING INSTRUCTIONS BETWEEN CACHES

CROSS-REFERENCE TO RELATED APPLICATIONS

This application for patent is related to the following applications for patent assigned to a common assignee.

INSTRUCTION PRE-FETCHING FOR MULTIPLE DATA PATHS, U.S. patent application Ser. No. 08/540,374, filed Dec. 6, 1995;

PRE-FETCHING DATA FROM MEMORY ACROSS PAGE BOUNDARIES, U.S. patent application Ser. No. 08/529,470, filed Sep. 18, 1995;

PROGRESSIVE DATA CACHE, U.S. patent application Ser. No. 08/519,031, filed Aug. 24, 1995;

MODIFIED L1/L2 CACHE INCLUSION FOR AGGRESSIVE PREFETCH, U.S. patent application Ser. No. 08/518,348, filed Aug. 25, 1995;

STREAM FILTER, U.S. patent application Ser. No. 08/519,032, filed Aug. 24, 1995; and CACHE DIRECTORY FIELD FOR INCLUSION, U.S. patent application Ser. No. 08/516,347, filed Aug. 8, 1995.

These applications for patent are hereby incorporated by reference in the present disclosure as if fully set forth herein.

TECHNICAL FIELD OF THE INVENTION

The present invention relates in general to data processing systems and, in particular, to a method of speculatively pre-fetching data into a cache.

BACKGROUND OF THE INVENTION

In modern microprocessor systems, processor cycle time continues to decrease as technology continues to improve. Also, design techniques of speculative execution, deeper pipelines, more execution elements and the like, continue to improve the performance of processing systems. The improved performance puts a heavier burden on the memory interface since the processor demands data and instructions more rapidly from memory. To increase the performance of processing systems, cache memory systems are often implemented.

Processing systems employing cache memories are well known in the art. Cache memories are very high-speed memory devices that increase the speed of a data processing system by making current programs and data available to a processor ("CPU") with a minimal amount of latency. Large on-chip caches (L1 caches) are implemented to help reduce the memory latency, and they are often augmented by larger off-chip caches (L2 caches).

The primary advantage behind cache memory systems is that by keeping the most frequently accessed instructions and data in the fast cache memory, the average memory access time of the overall processing system will approach the access time of the cache. Although cache memory is only a small fraction of the size of main memory, a large fraction of memory requests are successfully found in the fast cache memory because of the "locality of reference" property of programs. This property holds that memory references during any given time interval tend to be confined to a few localized areas of memory.

The basic operation of cache memories is well-known. When the CPU needs to access memory, the cache is examined. If the word addressed by the CPU is found in the cache, it is read from the fast memory. If the word addressed by the CPU is not found in the cache, the main memory is accessed to read the word. A block of words containing the one just accessed is then transferred from main memory to cache memory. In this manner, some data is transferred to cache so that future references to memory find the required words in the fast cache memory.

The average memory access time of the computer system can be improved considerably by use of a cache. The performance of cache memory is frequently measured in terms of a quantity called "hit ratio." When the CPU accesses memory and finds the word in cache, a cache "hit" results. If the word is found not in cache memory but in main memory, a cache "miss" results. If the CPU finds the word in cache most of the time, instead of main memory, a high hit ratio results and the average access time is close to the access time of the fast cache memory.

Pre-fetching techniques are often implemented to try to supply memory data to the on-chip L1 cache ahead of time to reduce latency. Ideally, data and instructions are pre-fetched far enough in advance so that copies of the instructions and data are always in the L1 cache when the processor needs it.

Pre-fetching of instructions and/or data is well-known in the art. However, existing pre-fetching techniques often pre-fetch instructions and/or data prematurely. Pre-fetching and then not using the pre-fetched instructions and/or data expands the time for a memory access but produces no benefit, thereby lowering the efficiency of the CPU.

A common example of this occurs whenever a processing system speculatively pre-fetches instructions when there are still unresolved branch instructions in the cache. The system may then pre-fetch instructions belonging in a branch that the program execution will not follow. The time spent fetching these instructions from memory is then wasted and causes unnecessary memory bus traffic.

There is therefore a need in the art for systems and methods which further reduce the latency of instruction accesses to an L1 instruction cache due to the pre-fetching of unneeded instructions.

SUMMARY OF THE INVENTION

It is an object of the present invention to provide an apparatus in the L1 I-cache (instruction cache) controller of a data processing system for pre-fetching speculative instruction cache lines from the L2 cache only. An underlying concept behind the present invention is that instruction pre-fetching on the main memory bus should be reserved for "true" cache misses. A "true" cache miss is one where the missed line of data will inevitably be required by the processor because there are no unresolved branches in the pending instructions that will cause the processor to cancel the request for the missed line.

It is another object of the present invention to disclose a method for pre-fetching instructions optimally such that speculative instruction stream pre-fetching does not adversely impact the processor bus utilization.

The present invention overcomes the problems inherent in speculative pre-fetching by providing a method of pre-fetching whereby instructions are pre-fetched into an L1 cache only from an L2 cache, and not from main memory, prior to the resolution of any unresolved branches in the pending instructions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
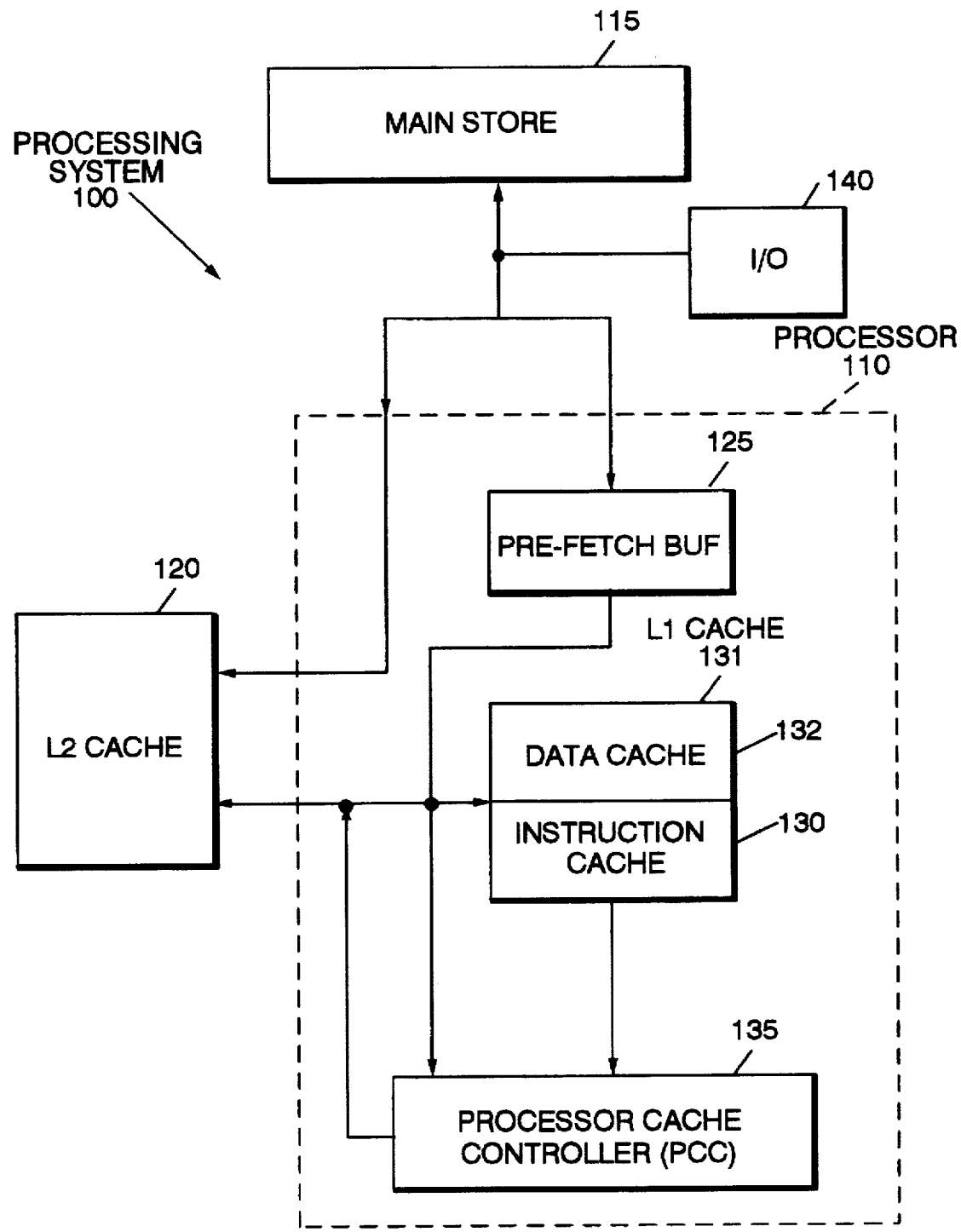
FIG. 1 is a high level block diagram of a processing system in accordance with the present invention.
Figure 2:
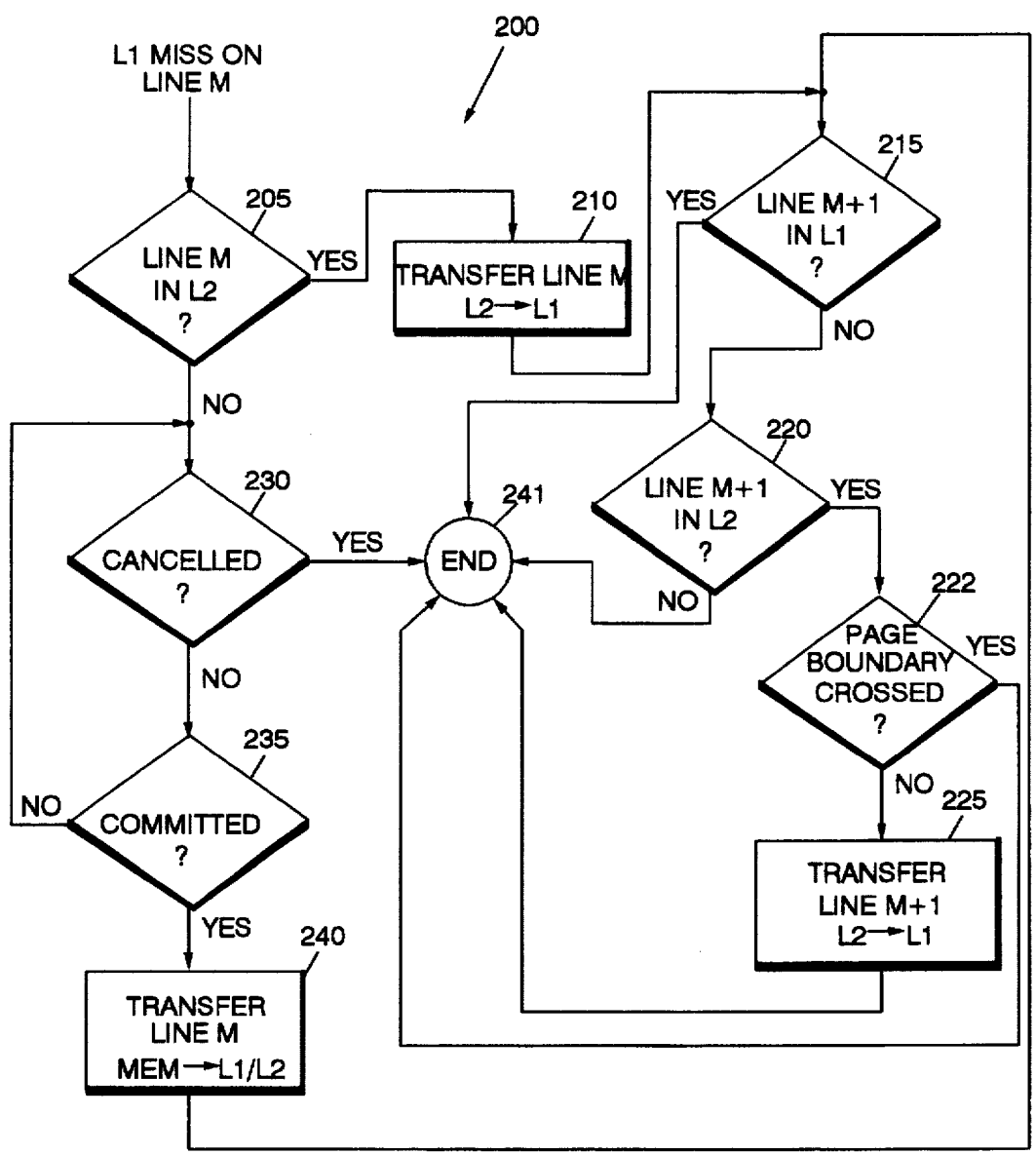
FIG. 2 is a flow diagram of a pre-fetching operation in accordance with the present invention.

The principles of the present invention and their advantages are best understood by referring to the illustrated embodiments depicted in FIGS. 1 and 2 of the drawings, in which like numbers designate like parts.

FIG. 1 depicts processing system 100, which includes processor 110, an embedded L1 cache 131 and an external L2 cache 120. In a preferred embodiment of the present invention, L1 cache 131 comprises data cache 132 for storing data and separate instruction cache (L1 I-cache) 130 for storing instructions. Separate data and instruction caches are well known in the art. Processor 110 is able to cache instructions and data received from main store memory 115 through pre-fetch buffer 125 in both L1 I-cache 130 and L2 cache 120.

L1 I-cache 130 holds frequently used copies of program instructions from main store 115 using any replacement policy known in the art, such as that disclosed in U.S. patent application Ser. No. (AA9-95-083), which is hereby incorporated by reference in the present disclosure. L2 cache 120 is larger and holds more data than L1 I-cache 130 and ordinarily controls the memory coherence protocol for system 100. In a preferred embodiment of the present invention, instructions in L1 I-cache 130 are not required to be contained in L2 cache 120.

The dotted line around processor 110 represents a chip boundary and a functional boundary but is not meant as a restriction on the scope of the invention. Processor cache controller (PCC) 135 controls fetching and storing to the memory subsystem (L1 cache 131, L2 cache 120). PCC 135 may also perform other functions in addition to controlling fetching and storing.

FIG. 2 depicts a flow diagram 200 for a state machine according to one embodiment of the present invention. A state machine in accordance with the present invention may reside in PCC 135 or elsewhere within processor 110. Cache lines of instructions can be speculatively fetched into L1 I-cache 130 from main memory 115 and L2 cache 120 by the present invention. A fetch is speculative if the instructions in the line that precedes the line being fetched include one or more unresolved branches.

However, program order must be maintained and the guessed target instruction(s) remains speculative until all preceding instructions are completed and intervening branches resolved. A speculative instruction becomes "inevitable-speculative" or "committed" when there are no preceding unresolved branches. Inevitable-speculative instructions are therefore executed unless there is an interruption, such as an external interrupt (e.g., from I/O 140).

Attention is directed to steps 205–241 of flow diagram 200. The present invention describes a method for pre-fetching lines into an instruction cache. The present invention uses a state machine to monitor the occurrence of L1 Misses to L1 I-cache 130. An "L1 Miss" is an access to L1 I-cache 130 that does not find the target line in L1 I-cache 130. When processor 110 requests cache line M from L1 cache 130 and cache line M is not in L1 cache 130 (i.e., an L1 Miss occurs), the state machine searches for the missed line (Line M) in L2 cache 120 (step 205). If Line M is resident in L2 cache 120, the state machine fetches Line M from L2 cache 120 into L1 I-cache 130 (step 210). If Line M is not in L2 cache 120 either, the present invention waits until all unresolved branches in pending Line M–1 have been resolved before fetching Line M from main memory 115 (steps 230 and 235). This prevents the unnecessary pre-fetching of instructions from main memory that may cancelled without ever being used. As used herein, "cancelled" means that the processor requests some other line, for example Line X, rather than the expected Line M. If all branches are resolved in Line M–1 and Line M is now committed, Line M is fetched from main memory 115 into L1 I-cache 130 and L2 cache 120 (step 240).

Regardless whether Line M is in L2 cache 120 or not, the state machine tests L1 I-cache 130 for the presence of the next higher line, Line M+1 (step 215). If Line M+1 is in L1 I-cache 130, no further action is needed (step 241). If Line M+1 is not in L1 I-cache 130, the state machine then tests L2 cache 120 for Line M+1 and, if found, speculatively pre-fetches Line M+1 from L2 cache 120 into L1 I-Cache 130 (steps 220 and 225).

The state machine also verifies whether Line M+1 crosses a logical boundary (page or block) in memory (step 222). Line M is normally translated into a real physical address, but Line M+1 is not. Therefore, Line M+1's location in physical memory is indeterminate. If Line M+1 is in a separate logical boundary, the state machine will not pre-fetch Line M+1 from L2 cache, thereby preserving bandwidth between L1 and L2 (step 241). Instead, when processor 110 requests Line M+1, flow diagram 200 will be re-entered at step 205.

If the Line M+1 is not in L2 cache 120, the present invention will not pre-fetch Line M+1 from main memory 115 into L1 I-cache 130 or L2 cache 120 until all branches in Line M have been resolved and Line M+1 becomes committed (step 241). The present invention waits to verify that there are no unresolved branches in Line M and the processor issues a request to L1 I-cache 130 for Line M+1 before occupying the main memory bus with a pre-fetch for Line M+1. The L1 request for Line M+1 will result in a L1 cache miss and flow diagram 200 will be re-entered at step 205. This prevents the pre-fetching of instructions that may be cancelled without ever being used.

The following table shows the preceding in tabular form.

| | | L1 LINE MISS | | |
|---|---|---|---|---|
| LINE | IN L2 | COMMITTED | BLOCK BOUNDARY | PREFETCH FROM L2 |
| M | NO | NO | NO | NO |
| M | NO | NO | YES | NO |
| M | NO | YES | NO | M + 1 |
| M | NO | YES | YES | NO |
| M | YES | NO | NO | M + 1 |
| M | YES | NO | YES | NO |
| M | YES | YES | NO | M + 1 |
| M | YES | YES | YES | NO |

It will be evident to one skilled in the art that the present invention may be used to speculatively pre-fetch from L2 cache 120 on L1 I-cache 130 hits, as well as L1 I-cache 130 misses.

Although the present invention and its advantages have been described in detail, it should be understood that various changes, substitutions and alterations can be made herein without departing from the spirit and scope of the invention as defined by the appended claims.

What is claimed is:

1. In a processing system comprising a processor, a first cache, a second cache and a main memory, a method for pre-fetching data into said first cache comprising the steps of:

detecting in said first cache a cache access event for a Line M;

searching said second cache for said Line M in response to said cache access event;

if said Line M is found in said second cache, transferring said Line M from said second cache to said first cache;

if said Line M is not found in said second cache, waiting until unresolved branch instructions in a Line M−1 are resolved before fetching said Line M from said main memory;

searching said first cache for a Line M+1; and if said Line M+1 is not found in said first cache, searching said second cache for said Line M+1.

2. The method as set forth in claim 1 wherein said cache access event is a cache miss.

3. The method as set forth in claim 1 wherein said cache access event is a cache hit.

4. The method as set forth in claim 1 including the further step of, if said Line M+1 is not found in said second cache, waiting until unresolved branch instructions in said Line M are resolved before fetching Line M+1 from said main memory.

5. The method as set forth in claim 1 including the further step of, if said Line M+1 is found in said second cache, determining whether said Line M+1 resides in a separate logical block of memory from said Line M.

6. The method as set forth in claim 5 including the further step of, if said Line M+1 does not reside in said separate logical block, transferring said Line M+1 from said second cache to said first cache.

7. The method as set forth in claim 5 including the further step of, if said Line M+1 does reside in said separate logical block, waiting until unresolved branch instructions in said Line M are resolved before transferring said Line M+1 from said second cache to said first cache.

8. In a processing system comprising a processor, a first cache, a second cache and a main memory, a method for pre-fetching data into said first cache comprising the steps of:

detecting in said first cache a cache access event for a Line M;

searching said second cache for a Line M+1 in response to said cache access event;

if said Line M+1 is not found in said second cache, waiting until unresolved branch instructions in said Line M are resolved before fetching said Line M+1 from said main memory;

if said Line M+1 is found in said second cache, determining whether said Line M+1 resides in a separate logical block of memory from said Line M; and if said Line M+1 does not reside in said separate logical block, transferring said Line M+1 from said second cache to said first cache.

9. The method as set forth in claim 8 wherein said cache access event is a cache miss.

10. The method as set forth in claim 8 wherein said cache access event is a cache hit.

11. The method as set forth in claim 8 including the further step of, if said Line M+1 does reside in said separate logical block, waiting until unresolved branch instructions in said Line M are resolved before transferring said Line M+1 from said second cache to said first cache.

12. A processing system comprising:

a processor;

a first cache;

a second cache;

a main memory;

means for detecting in said first cache a cache access event for a first data;

means responsive to said cache access event for determining if a second data sequential to said first data is present in said second cache;

means responsive to a determination that said second data is not present in said second cache for waiting until unresolved branch instructions in said first data are resolved before fetching said second data from said main memory;

means responsive to a determination that said second data is present in said second cache for determining if said second data resides in a separate logical block of memory from said first data; and means responsive to a determination that said second data does not reside in said separate logical block for transferring said second data from said second cache to said first cache.

13. The processing system as set forth in claim 12 wherein said cache access event is a cache miss.

14. The processing system as set forth in claim 12 wherein said cache access event is a cache hit.

15. The processing system as set forth in claim 12 further comprising means responsive to a determination that said second data does reside in said separate logical block for waiting until unresolved branch instructions in said first data are resolved before transferring said second data from said second cache to said first cache.

* * * * *